US 8,905,334 B2

(12) United States Patent
Bachmaier et al.

(10) Patent No.: US 8,905,334 B2
(45) Date of Patent: Dec. 9, 2014

(54) HYDRAULIC STROKE TRANSMITTER

(75) Inventors: Georg Bachmaier, München (DE);
Gerit Ebelsberger, München (DE);
Bernhard Fischer, Töging A. Inn (DE);
Matthias Gerlich, München (DE);
Michael Höge, Feldkirchen (DE);
Wolfgang Zöls, München-Lochhausen (DE)

(73) Assignee: Siemens Aktiengesellschaft, Munich (DE)

( * ) Notice: Subject to any disclaimer, the term of this patent is extended or adjusted under 35 U.S.C. 154(b) by 551 days.

(21) Appl. No.: 13/262,208

(22) PCT Filed: Feb. 25, 2010

(86) PCT No.: PCT/EP2010/052363
§ 371 (c)(1),
(2), (4) Date: Sep. 29, 2011

(87) PCT Pub. No.: WO2010/112275
PCT Pub. Date: Oct. 7, 2010

(65) Prior Publication Data
US 2012/0018542 A1   Jan. 26, 2012

(30) Foreign Application Priority Data
Mar. 31, 2009 (DE) .......................... 10 2009 015 738

(51) Int. Cl.
*F16K 31/00* (2006.01)
*F02M 61/20* (2006.01)
(Continued)

(52) U.S. Cl.
CPC ........ *F02M 51/0603* (2013.01); *F16K 31/1221* (2013.01); *F16K 41/10* (2013.01); *F02M 61/167* (2013.01)

USPC ................ 239/533.9; 239/533.2; 239/584; 239/585.1; 251/335.3

(58) Field of Classification Search
CPC ... F16K 31/122; F16K 31/1221; F16K 41/10; F02M 47/046
USPC .......... 239/102.1, 102.2, 533.2, 533.3, 533.7, 239/533.9, 584, 585.1, 585.3, 585.5; 251/54, 335.3
See application file for complete search history.

(56) References Cited

U.S. PATENT DOCUMENTS 6,213,414 B1 *  4/2001  Stier et al. ...................... 239/584
6,685,105 B1 *  2/2004  Ruehle et al. ............... 239/102.1
(Continued)

FOREIGN PATENT DOCUMENTS

DE  196 46 847 A1  6/1997
DE  198 38 862 A1  3/2000
(Continued)

OTHER PUBLICATIONS

Office Action for German Patent Appln. No. 102009015.738.7; dated Jan. 18, 2010.
(Continued)

Primary Examiner — Ryan Reis
(74) Attorney, Agent, or Firm — Staas & Halsey LLP

(57) ABSTRACT

A stroke translator or an injector having a solid-state actuator for generating a stroke and a hydraulic system for the hydraulic transmission of the stroke of the solid-state actuator to a control element such as a jet needle of a valve. The hydraulic system has hydraulic volumes hermetically sealed to the outside by metal bellows and constitute a hydraulic bearing with compensation for play. The advantages over known hydraulic levers are such that a complete metal seal is provided, and that a lower-wear design can be realized. Furthermore, a modular structure can be produced.

14 Claims, 3 Drawing Sheets

(51) Int. Cl.
*F02M 51/00* (2006.01)
*B05B 1/30* (2006.01)
*F02M 51/06* (2006.01)
*F16K 31/122* (2006.01)
*F16K 41/10* (2006.01)
*F02M 61/16* (2006.01)

(56) References Cited

U.S. PATENT DOCUMENTS 7,066,399 B2 * 6/2006 Hohl ............................ 239/102.2
7,267,111 B2 * 9/2007 Liskow ........................ 123/498

FOREIGN PATENT DOCUMENTS

| | | | |
|---|---|---|---|
| DE | 199 58 704 | A1 | 6/2001 |
| DE | 19958704 | A1 * | 6/2001 |
| DE | 101 48 594 | A1 | 4/2003 |
| DE | 102 60 349 | A1 | 7/2004 |
| DE | 102004015622 | A1 | 6/2005 |
| DE | 102004022620 | A1 | 12/2005 |
| DE | 102005042786 | A1 | 3/2007 |
| DE | 102007053423 | A1 | 5/2009 |
| DE | 102009015738.7 | | 10/2010 |
| EP | 1 111 230 | A2 | 6/2001 |
| EP | 1 519 036 | A1 | 3/2005 |
| WO | 2005/026528 | A1 | 3/2005 |

OTHER PUBLICATIONS

International Search Report for PCT/EP2010/052363 dated Jul. 8, 2010.

* cited by examiner

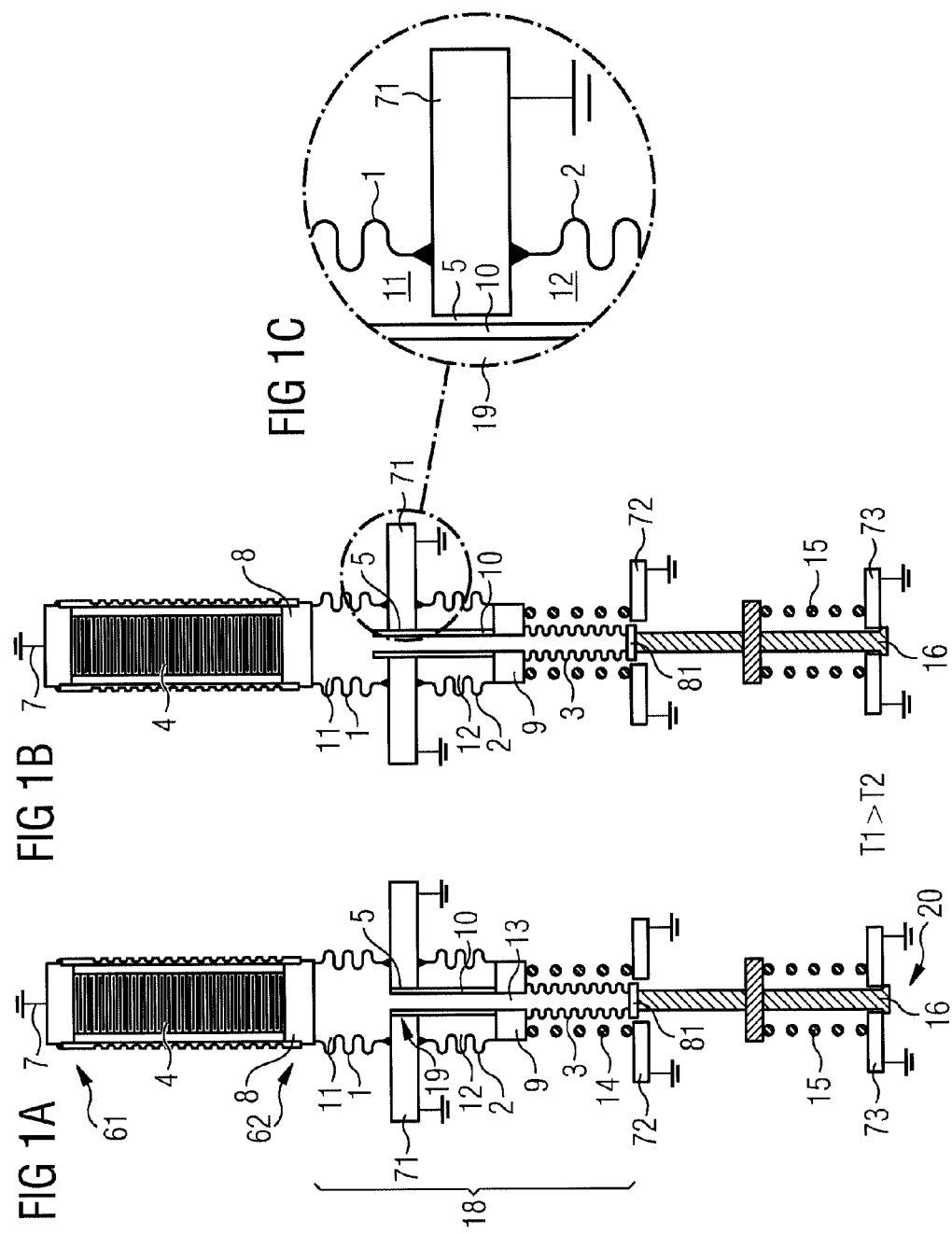

HYDRAULIC STROKE TRANSMITTER

CROSS REFERENCE TO RELATED APPLICATIONS

This application is the U.S. national stage of International Application No. PCT/EP2010/052363, filed Feb. 25, 2010 and claims the benefit thereof. The International Application claims the benefits of German Application No. 102009015738.731 filed on Mar. 31, 2009, both applications are incorporated by reference herein in their entirety.

BACKGROUND

Described below is a hydraulic stroke transmitter which forwards a stroke predetermined by a solid state actuator. Generally, stroke translation is combined therewith in order to increase the originally short stroke of the solid state actuators.

For introducing a desired quantity of fuel into any combustion processes, injectors are generally required, by which a quantity of fuel may be metered. As very many combustion processes are performed by the direct injection of fuel under high pressure, frequently actuators are used which operate particularly rapidly and which drive injectors. This means that an actuator generates a stroke which, for example, actuates an injector needle which in turn opens a valve and releases fuel at predetermined time intervals and at adjustable flow rates for a combustion process. In this case, combustion air is supplied separately.

Injectors for high-pressure direct injection frequently use rapid actuators in this situation, such as for example piezoelectric multilayer actuators (PMA). The actuators are solid state actuators, the central element thereof having a plurality of piezoelectric layers. Moreover, so-called magnetostrictive solid state actuators are known which utilize a magnetic mechanical effect for generating a stroke. For generating a stroke it is important that such solid state actuators have a sufficiently small stroke in order to open an injector needle to such an extent that the desired quantity of fuel is introduced. This leads to a substantial problem, particularly in gas injectors which require a larger stroke than injectors which meter liquid fuel. As a result, only designs with a stroke translator are considered.

Where hydrogen is used as fuel, it is a drawback that the small and lightweight hydrogen molecule easily diffuses through non-metallic elements such as rubber membranes. Thus, the choice of a suitable stroke translator becomes a crucial issue in the design of the injector. This is also due to the fact that a stroke translator determines many properties of an injector and, in contrast to an actuator, may be structurally redesigned.

In previous solutions to the problem, the stroke is increased by mechanical translation or by partial hydraulic stroke translation sealed in a non-metallic manner. Mechanical stroke translators which, for example, use a mechanical lever are generally susceptible to wear and to undesirable vibrations. This applies, in particular, when an idle stroke is necessary between the actuator and the stroke translator, for example in order to prevent a leakage which could occur in the event of thermal alteration to the length due to heating. As a result, the actuator strikes against a jet needle, for example, whereby the injector is negatively affected. Uneven injection and unreliable opening and closing characteristics result. An idle stroke between the actuator and the stroke translator is also undesirable as the displacement of the actuator as far contact with the jet needle remains unexploited.

An increase of the stroke of an actuator with a transmission ratio of less than 1:2 is often implemented by mechanical levers. In injectors for diesel engines, for example, the mechanical transmission ratio may be 1:1.6. Gas injectors typically require higher transmission ratios. In gas injectors, hydraulic stroke translators, also denoted as hydraulic levers, are generally used. In the direct injection of CNG (compressed natural gas), for example, a stroke transmission ratio of 1:6 is used.

By the use of a hydraulic stroke translator, the idle stroke may be avoided so that the functional chain between the actuator and jet needle is continuously present. This is directly reflected in the structural design. In other words, the displacement of the actuator is exploited and implemented to a greater extent by the injector.

In motor vehicle technology, a drawback in the related art is, for example, the wide temperature range which has to be taken into account and which may range from −40° C. to +150° C. This may involve considerable alterations to the volume in the case of fluid volumes. Peak values may be considerably above 30% of the volume increase. For this reason, hydraulic stroke translators generally require a connection to a reservoir.

In the German published patent application DE 10 2005 042 786 A1, for example, a fuel injector is disclosed which is provided with a hermetically sealed hydraulic system. In this publication, so-called guided pistons are used. Such guided pistons require high mechanical precision in manufacture and are very susceptible to wear.

SUMMARY described below is a hydraulic stroke translator which has a sealed hydraulic system, forms a hydraulic bearing and is designed to be low-wear.

A hydraulic stroke translator described below has the advantage that guides for guided pistons, which are susceptible to wear and which are very costly both in production and in operation, are avoided. The new design of hydraulic stroke translator acts in the short periods during the injection phase of an injector as a known hydraulic stroke translator, namely as a rigid bearing. Additionally, the new hydraulic stroke translator compensates for alterations in length which, as before, are present as a result of temperature fluctuations. This is based on the variable coefficients of expansion of the different materials.

It is advantageous that a hydraulic stroke transmitter is constructed with a low-wear design. This has the result that no pistons or piston guides, which are costly to produce and which are also susceptible to wear during operation, have to be fitted.

The hermetic seal of a hydraulic system is advantageously improved by the use of metal bellows which define a plurality of hydraulic volumes hermetically sealed to the outside. The hydraulic volumes are connected together either in a throttled or unthrottled manner.

If initially the nature of a hydraulic stroke transmitter is considered, so-called hydraulic bearings ensure compensation for play, with compensation for an idle stroke which occurs. Thus, for example, an actuator continues to bear against a jet needle. A further advantage is achieved by a metal seal in the form of the metal bellows, which provides the substantial advantage of a leakage-free seal. Both advantages are associated with different time constants of the hydraulic system.

In the brief periods of injection carried out, for example, by an injector, the hydraulic bearing functions as a support acting on a fixed bearing, during the injection process of the injector. To this end, a throttle is provided in the hydraulic system. Over longer time periods, however, it is possible to compensate for the variable expansion of the different materials, by slow compensation processes in the hydraulic system taking place over throttled paths.

For completing the optimized hermetic seal of the hydraulic system, the metal bellows are connected in each case via welded seams to their adjacent components.

It is also associated with particular advantages if greater hydraulic volumes, which are not able to be produced otherwise, are reduced by displacement elements. Thus it is ensured that a low-loss stroke transmitter may be produced. This is based on the fact that so-called incompressible fluids have a finite coefficient of temperature expansion. This can have a negative effect with larger quantities of liquid in the event of fluctuating temperature and/or fluctuating pressure.

For the advantageous configuration of the hydraulic system, the positioning of the metal bellows is arranged concentrically to the solid state actuator axis of the solid state actuator.

The hydraulic system has only one movable piston which is not moved in the event of a stroke transmission or stroke transformation, but only in the event of temperature alterations, in particular in the hydraulic fluid in the hydraulic volumes. In this case, the possibility of predetermining the pressure in the hydraulic fluid is very advantageous. In particular, a mechanical spring is advantageous for setting the pressure.

For reducing the volume of hydraulic fluid, at least one displacement element may be inserted into at least one of the hydraulic volumes (11, 12, 13).

The advantages over known hydraulic levers are such that a complete metal seal is provided and a low-wear design may be implemented.

Moreover, a modular design may be produced. The use of metal bellows has the advantage that a completely sealed and low-friction hydraulic stroke transmitter may be produced.

A stroke translator or even a stroke reducer may be easily constituted by the layout of the pressure-effective surfaces in the hydraulic system. This produces a hydraulic bearing with stroke transformation.

BRIEF DESCRIPTION OF THE DRAWINGS

These and other aspects and advantages will become more apparent and more readily appreciated from the following description of the exemplary embodiments with reference to the accompanying drawings of which:

FIG. 1A is a schematic, partial cross-section of a hydraulic stroke transmitter with compensation for play, which is connected to a jet needle, at the temperature T1, FIG. 1B is a shows is a schematic, partial cross-section view, according to FIG. 1A, of the metallically sealed hydraulic stroke transmitter with compensation for play being at a lower operating temperature T2, FIG. 1C is a detail view, according to FIG. 1B, of the annular gap between the hollow cylinder of the movable piston and the central opening in the fixed bearing being illustrated.

DETAILED DESCRIPTION OF THE PREFERRED EMBODIMENT

Figure 2A:
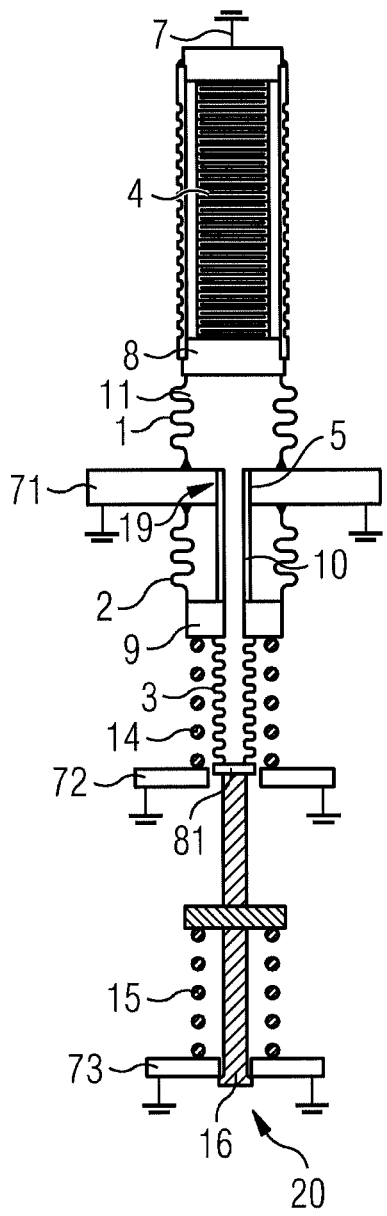
FIG. 2A is a schematic, partial cross-section of a metallically sealed hydraulic stroke transmitter with compensation for play in combination with a jet needle, through which a valve is actuated.

Reference will now be made in detail to the preferred embodiments, examples of which are illustrated in the accompanying drawings, wherein like reference numerals refer to like elements throughout.

FIGS. 1A and 1B show in principle the same design, the operating temperature T1 being present in FIG. 1A, which is higher than the operating temperature T2 according to FIG. 1B. Both figures have substantially the same components denoted by the same reference numerals. A solid state actuator 4 is present which may be a piezoelectric actuator or a magnetostrictive actuator. The actuator is supported at the rear with its rear end 61 on a fixed bearing 7. At the front end 62 of the solid state actuator, the solid state actuator has an end plate 8 which may be connected via a welded seam to the first metal bellows 1. In this case, the first hydraulic volume 11 is shown.

The first metal bellows 1 is connected at its other end, viewed in the axial direction of the solid state actuator 4, to a fixed bearing 71, in a fixed and hermetically sealed manner which may be produced by a welded seam.

The fixed bearing 71 is provided with a central opening 19, into which a hollow cylinder 10 forming part of a movable piston 9 axially runs and extends at least as far as the first hydraulic chamber 11. The internal volume of the hollow cylinder 10 forms part of the third hydraulic chamber 13. A second hydraulic chamber 12 is shown, by a second metal bellows 2 being positioned concentrically to the hollow cylinder 10, and is welded to the fixed bearing 71 and to the top of the movable piston 9. To this end, the piston 9 has a part of greater diameter than the hollow cylinder 10 and includes a central opening, the diameter thereof approximately corresponding to the internal diameter of the hollow cylinder.

A third metal bellows 3 is, on the one hand, welded to the movable piston and, on the other hand, to an end plate 81. The hydraulic system 18 of the stroke transmitter is produced in this manner. For constituting an injector, in each case the rear end of a jet needle 16 which opens and closes a valve 20 may be in contact with or connected to the end plate 81.

By the spring 14, supported by the fixed bearing 72, the movable piston 9 is subjected to pressure, the pressure being able to be set via the spring. Thus the pressure which is present in the entire hydraulic system 18 and which may be set in a uniform manner in the hydraulic chambers 11, 12, 13, may be predetermined via the spring 14. The spring 15 acts as a restoring spring for the valve 20.

In the detail which is indicated in FIG. 1B and which is shown enlarged in FIG. 1C, it may be seen that the first metal bellows 1 and the second metal bellows 2 on opposing sides of the fixed bearing 71 are in each case fixedly attached and coupled in a hermetically sealed manner by a welded seam. In this case, a first hydraulic volume 11 is defined by the first metal bellows 1 and a second hydraulic volume 12 is defined by the second metal bellows 2. Moreover, the opening 19 in the fixed bearing 71 is indicated at the central position, the hollow cylinder 10 which is part of the movable piston 9 being partially shown. The annular gap 5 is formed between the hollow cylinder 10 and the edge of the opening 19 of the fixed bearing 71. This annular gap 5 forms the throttle between the first and the second hydraulic volume 11, 12.

The third hydraulic volume 13 is radially defined by the movable piston 9, shown as a whole as a hollow body, as well as the third metal bellows 3 which, at its end remote from the solid state actuator 4, is terminated by an end plate 81. Thus it is clear that the first hydraulic volume 11 is connected in a throttled manner to the second hydraulic volume 12 and is connected in an unthrottled manner to the third hydraulic volume 13.

For producing an injector, a jet needle which controls a valve 20 is additionally attached to the end plate 81.

By the operation of the solid state actuator 4, the hydraulic fluid contained in the hydraulic volumes 11, 12, 13 in each case is compressed during a stroke and ensures a corresponding stroke translation via the ratio of the pressure-effective surfaces in the first hydraulic volume 11 and in the third hydraulic volume 13. Significant here is the ratio of the annular surfaces on the underside of the first hydraulic volume 11 and on the underside of the third hydraulic volume 13, i.e. on the end plate 81.

It may be seen in FIG. 1B that as a result of the temperature T2, which is lower than the temperature T1 according to FIG. 1A, a contraction of the hydraulic fluid has resulted in a shortening of the second metal bellows 2. There is no idle stroke between the actuator and jet needle. This means that a compensation of the mechanical play which occurs as a result of temperature fluctuations has been compensated by the hydraulic stroke transmitter, in particular the hydraulic stroke translator. With a further stroke of the solid state actuator 4, the hydraulic stroke transmitter briefly picks up on a fixed hydraulic bearing and/or a fixed hydraulic lever, as the flow rate of hydraulic fluid in the annular gap 5 is throttled and thus limited.

Figure 2B:
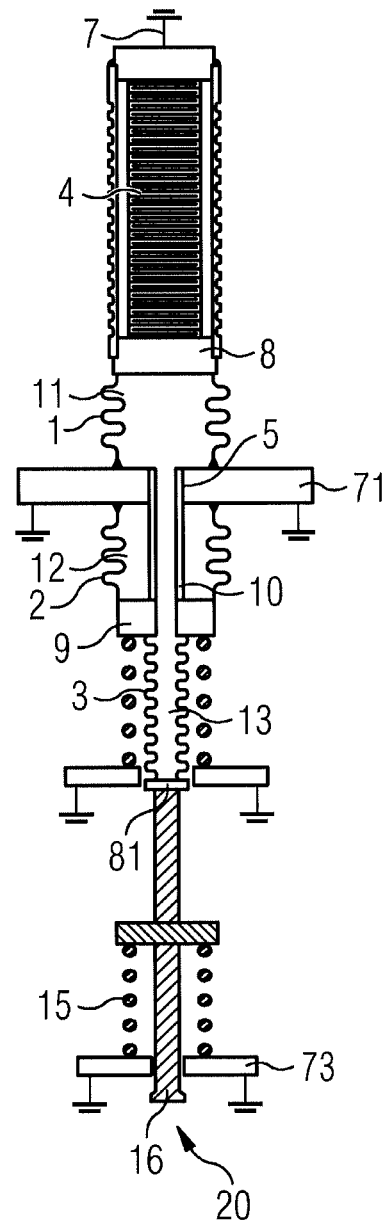
FIG. 2B is a schematic, partial cross-section of the open state of the valve in a view according to FIG. 2A.

In FIG. 2A, a closed injector is shown and in FIG. 2B an open injector is shown with the open valve 20. The design of the stroke transmitter in FIGS. 2A, 2B corresponds without alteration to that of FIG. 1A or FIG. 1B. When comparing FIGS. 2A and 2B, the difference is that the solid body actuator 4 in FIG. 2B is shown in the elongated state. In other words, its dimensions are greater in the longitudinal direction than in FIG. 2A. Thus the hydraulic fluid is compressed in the first hydraulic volume 11 and the first metal bellows 1 is also compressed. The increased pressure in the first hydraulic volume 11 continues into the third hydraulic volume 13 in an unthrottled manner. Thus the third metal bellows 3 is lengthened by a specific amount due to the ratios of the pressure-effective surfaces, as disclosed above. The same occurs with the jet needle 16 which is correspondingly displaced.

In order to eliminate the susceptibility of the hydraulic system 18 to temperature fluctuations, it is advantageous to adapt large hydraulic volumes as far as possible. This generally means reducing the hydraulic volume, which is directed to such regions which do not hinder the required hydraulic flows.

Figure 3:
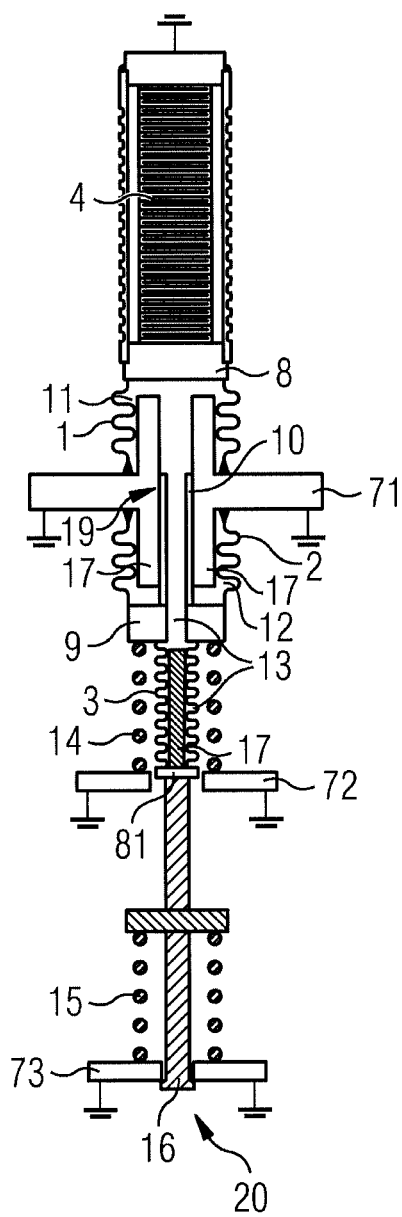
FIG. 3 is a schematic, partial cross-section of an embodiment which includes displacement devices in a large hydraulic volume.

FIG. 3 shows a hydraulic stroke transmitter or hydraulic stroke translator according to FIGS. 1A, 1B, 2A with a closed valve, whereby an injector is produced. In this case, at least one displacement element 17 is accommodated and/or formed in one or more hydraulic volumes. In FIG. 3, the displacement element 17 is initially of cuboidal or annular configuration in the first hydraulic volume 11, the displacement element 17 being part of the fixed bearing 71. In the view according to FIG. 3, the fixed bearing 1 is also provided with cuboidal or annular displacement elements 17, which protrude in the direction of the jet needle into the second hydraulic volume 12. It is significant here that elements which have been moved, such as for example the movable piston 9, are not hindered in their movement.

A further displacement element in FIG. 3 is positioned in the third hydraulic volume 13, the displacement element being able to be connected to the end plate 81, and thus the pressure-effective surface on the end plate 81 being displaced in the direction of the actuator.

The new design acts as a known hydraulic lever in the brief periods during which the injector injects. Additionally, the design compensates for alterations in length which, for example, occur as a result of temperature alterations. The design itself is a closed unit, able to be produced separately and thus without leakages. It is completely metallically sealed and does not require any guides.

The advantages of stroke translation, compensation for play in order to avoid an idle stroke, freedom from leakage by the use of metal seals and the absence of guides which are susceptible to wear. Many advantages are present relative to embodiments using mechanical levers. A hydraulic system has the advantage that the actuator continues to bear against a jet needle, so that no idle stroke occurs. Thus only small vibrations are produced, no idle stroke is generated and the activity of the actuator is utilized in an optimized manner.

The metallically sealed, hydraulic stroke transmitter with compensation for play includes three metal bellows 1, 2, 3. The metal bellows are filled with a hydraulic fluid. Moreover, a fixed bearing is included as well as a spring between the fixed bearing and the piston, and/or a movable piston. The fixed bearings denoted hereinafter as the fixed bearings 7, 71, 72, 73, may, for example, all form part of a housing for a hydraulic stroke transmitter, hydraulic stroke translator or an injector.

The first metal bellows 1 is welded to an end plate 8 of the solid state actuator 4 and to a fixed bearing 71. The end plate 8 may be part of the actuator. The second metal bellows 2 is welded to the fixed bearing 71 and to the movable piston 9. The third metal bellows 3 is welded to the movable piston 9 and to an end plate 81. The end plate 81 seals the third hydraulic volume and serves for transmitting force to the jet needle 16.

Via an opening 19 which may be centrally positioned in the fixed bearing 71, a fluid path is provided for the hydraulic fluid in the first hydraulic volume 11 in the metal bellows 1 for connecting to the hydraulic fluid in the third hydraulic volume in the third metal bellows 3.

The first hydraulic volume 11 in the first metal bellows 1 is also connected to the second hydraulic volume 12 of the second metal bellows 2, but only via the annular gap 5 acting as a throttle, on the fixed bearing 71 between the first metal bellows 1 and the second metal bellows 2. Slow compensation processes may take place via this annular gap 5, whereby the movable piston 9 is displaced. Over time, therefore, the same pressure generally prevails in all three hydraulic volumes 11, 12, 13. This is determined by the spring 14 between the housing and the movable piston 9. This is also the case when the volume of the hydraulic fluid is altered by temperature fluctuation. In FIG. 1B, this is shown in the case of cooling. The first metal bellows 3 expands, but the larger second metal bellows 2 is compressed. Overall, the second and third hydraulic volumes 12, 13 are so much smaller that the thermal effects are compensated. The first hydraulic volume 11 in this case remains constant, secondary effects, such as the rigidity of the actuator, being negligible. No leakage occurs as the entire hydraulic system 18 is enclosed in metal bellows. The pressure in the hydraulic fluid remains constant, at least as long as the spring 14 operates in a proportional area. The thermal longitudinal compensation is an advantage, but compensation is also provided for such longitudinal alterations, which are not thermally generated. Included therein are ageing processes in the solid state actuator, for example, which can alter the polarization thereof and thus the length thereof. As a result of the compensation for play all elements remain in contact.

With rapid processes, a quite different behavior of the system is exhibited. During the brief actuation period of the actuator, the flow resistance in the annular gap 5 is sufficiently high for practically no fluid exchange to take place between the first and the second hydraulic volumes 11, 12. Typical injection processes during fuel injection in the motor vehicle, however, only last a few milliseconds.

Thus the two desirable properties: "hydraulically sealed with compensation for play" and "metallically sealed in a leakage-free manner" are combined in one arrangement. The separation of the functions takes place over the different time constants. In this case, the time constants of the compensation for play may be set by the dimensioning of the size of the annular gap 5 and the viscosity of the hydraulic fluid. Only metal bellows are moved. These require no particular guides and also are not particularly susceptible to wear.

The exemplary embodiment with reduced hydraulic volume corresponding to FIG. 3 shows the solution to one possible practical problem, which may occur in the preceding figures. With a relatively large volume of hydraulic fluid, firstly the requirement for compensated volumes in the event of temperature alterations may be directly proportional to the filled quantity of hydraulic fluid. Secondly, the hydraulic rigidity of a fluid column reduces with height. A low-loss stroke transmitter, however, is intended to have a characteristic which is as rigid as possible. Both problems may be reduced if the space inside the metal bellows is partially filled by one or more displacement bodies. The shape of the displacement elements is freely selectable, as long as the required bellows movement for compensation for play according to FIGS. 1A and 1B and for the injection according to FIGS. 2A and 2B is not hindered. FIG. 3 shows an exemplary embodiment with two displacement bodies 17, both displacement elements being rotary parts which may be easily produced, and simply being enlargements of components which are otherwise necessary.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A hydraulic stroke transmitter to a control element, comprising:
    a solid state actuator for generating a stroke; and
    a hydraulic system forming a hydraulic bearing for the solid state actuator that transmits the stroke of the solid state actuator to the control element and provides compensation for play, the hydraulic system including hydraulic volumes hermetically sealed by metal bellows outside the hydraulic stroke transmitter, and
    wherein a first of the metal bellows, forming a first hydraulic volume, is fixed and hermetically sealed to a first fixed bearing and an end plate at a front end of the solid state actuator,
    a second of the metal bellows, forming a second hydraulic volume, is fixed and hermetically sealed to the first fixed bearing and a movable piston connected with a hollow cylinder, and
    a third of the metal bellows, forming a third hydraulic volume, is fixed and hermetically sealed to the movable piston and another end plate.

2. The stroke transmitter as claimed in claim 1, wherein the control element is a jet needle of a valve.

3. The stroke transmitter as claimed in claim 1, wherein the hydraulic volumes are filled with hydraulic fluid.

4. The stroke transmitter as claimed in claim 1,
    wherein the second hydraulic volume is defined on an outer periphery by the second of the metal bellows, on a front face by a radial surface of the movable piston and by a radial surface on the first fixed bearing as well as internally by the movable piston, the hollow cylinder extending through an opening in the first fixed bearing as far as the first hydraulic volume, forming an annular gap, so that the first and the second hydraulic volumes are connected together via the annular gap, and
    wherein a transmitted stroke of the solid state actuator is able to pick up on the another end plate.

5. The stroke transmitter as claimed in claim 4, wherein the stroke transmitter is one of a stroke translator and a stroke reducer.

6. The stroke transmitter as claimed in claim 5, wherein connections between the metal bellows to adjacent components are constituted by welded connections.

7. The stroke transmitter as claimed in claim 6, wherein the metal bellows are arranged concentrically to an axis of the solid state actuator.

8. The stroke transmitter as claimed in claim 7, wherein a pressure prevailing in the hydraulic volumes is able to be set to a predetermined value by a spring which acts on the movable piston.

9. The stroke transmitter as claimed in claim 8, wherein at least one of the hydraulic volumes includes at least one displacement element.

10. The stroke transmitter as claimed in claim 9, wherein the stroke transmitter may be produced as a module.

11. An injector for metering fluids, comprising
    a valve having a control element;
    a solid state actuator to generate a stroke; and
    a hydraulic system constituting a hydraulic bearing for the solid state actuator, transmitting the stroke of the solid state actuator to the control element of the valve, and providing compensation for play, the hydraulic system including hydraulic volumes hermetically sealed by metal bellows outside the hydraulic stroke transmitter,
    wherein a first of the metal bellows, forming a first hydraulic volume, is fixed and hermetically sealed to a first fixed bearing and an end plate at a front end of the solid state actuator,
    a second of the metal bellows, forming a second hydraulic volume, is fixed and hermetically sealed to the first fixed bearing and a movable piston connected with a hollow cylinder, and
    a third of the metal bellows, forming a third hydraulic volume, is fixed and hermetically sealed to the movable piston and another end plate.

12. The injector as claimed in claim 11,
wherein the movable piston includes the hollow cylinder which extends through the second hydraulic volume, as well as through an opening in the first fixed bearing and extends as far as the first hydraulic volume, and
wherein the control element of the valve is a jet needle bearing against or attached to the another end plate terminating the third metal bellows.

13. The injector as claimed in claim 12, wherein at least one of the hydraulic volumes includes at least one displacement element.

14. The injector as claimed in claim 13, wherein the stroke transmitter is one of a stroke translator and a stroke reducer.

\* \* \* \* \*